(12) United States Patent
Gaydos et al.

(10) Patent No.: US 6,197,448 B1
(45) Date of Patent: Mar. 6, 2001

(54) HYDROGEN STORAGE ALLOY (75) Inventors: Mark Gaydos, Nashua, NH (US); Weifang Luo, Norwood, MA (US)

(73) Assignee: Duracell Inc., Bethel, CT (US)

( * ) Notice: Subject to any disclaimer, the term of this patent is extended or adjusted under 35 U.S.C. 154(b) by 0 days.

(21) Appl. No.: 08/991,027

(22) Filed: Dec. 15, 1997

Related U.S. Application Data (63) Continuation-in-part of application No. 08/866,192, filed on May 30, 1997, now abandoned.

(51) Int. Cl.[7] ............... H01M 4/38; C01B 6/24
(52) U.S. Cl. ............ 429/218.2; 429/223; 429/224; 420/900; 29/623.1
(58) Field of Search ............... 429/218.2, 59, 429/101, 224, 223; 29/623.1; 420/900

(56) References Cited

U.S. PATENT DOCUMENTS

| | | | |
|---|---|---|---|
| 4,837,119 | 6/1989 | Ikoma et al. | 429/206 |
| 4,977,043 | 12/1990 | Kadouchi et al. | 429/54 |
| 5,541,017 | * 7/1996 | Hong et al. | 429/218.2 X |
| 5,578,266 | * 11/1996 | Takai et al. | 429/900 X |
| 5,656,388 | * 8/1997 | Bugga et al. | 429/218.2 X |

FOREIGN PATENT DOCUMENTS

| | | |
|---|---|---|
| 6-215762 | 8/1994 | (JP). |
| 6-215767 | 8/1994 | (JP). |
| 6-306515 | 8/1994 | (JP). |

OTHER PUBLICATIONS

Chen et al., Journal of Alloys and Compounds, 231:550–552 (1995) (Month Unknown).

* cited by examiner

*Primary Examiner*—Stephen Kalafut
(74) *Attorney, Agent, or Firm*—Fish & Richardson P.C.

(57) ABSTRACT

A hydrogen storage alloy of the $AB_5$-type, where the A component includes La and/or Nd and at least 0.4 mole fraction Pr, as well as batteries including the alloy, are disclosed.

40 Claims, 10 Drawing Sheets

HYDROGEN STORAGE ALLOY

CROSS REFERENCE TO RELATED APPLICATIONS

This is a continuation-in-part of U.S. application Ser. No. 08/866,192, filed May 30, 1997, now abandoned.

BACKGROUND OF THE INVENTION

The invention relates to hydrogen storage alloys for use in rechargeable batteries.

A battery typically includes one or more galvanic cells (i.e., cells that produce a direct current of electricity) in a finished package. In each cell, two electrodes are separated by an electron insulator, but are joined by an ion-carrying path. The electron-carrying path of the battery is external; the path proceeds, via a conductor, through a device where work is done. The ion-carrying path of the battery is internal and proceeds via an electrolyte.

The electrodes are usually composed of dissimilar metals. For discharge of a cell, the electrode where the electrolyte is broken down upon the receipt of electrons is the positive electrode, also referred to as the cathode. The electrode where the metal goes into solution, releasing electrons, is called the negative electrode, or anode. The electrolyte generally is composed mainly of an ionizable salt dissolved in a solvent.

Batteries may be rechargeable; such batteries are called "storage" or "secondary" batteries. Storage batteries can be recharged by passing current through the cells in the opposite direction of current flow on discharge. The chemical conditions of the battery are restored, and the cells are ready to be discharged again. Primary batteries, on the other hand, are meant to be discharged to exhaustion once, and then discarded.

An example of a rechargeable battery is a metallic oxide-hydrogen storage battery. The positive electrode of this battery includes a metal oxide, such as nickel oxide; the negative electrode includes a hydrogen storage alloy; and the electrolyte includes an alkaline solution.

An example of an electrode reaction in a nickel oxide-hydrogen storage battery is as follows. Postive electrode:

Native electrode:

In the reaction equation (2), M represents a hydrogen storage alloy. Hydrogen storage alloys are capable of electrochemically absorbing and discharging large quantities of hydrogen. One type of hydrogen storage alloy is the $AB_5$-type, which has a crystal structure of the $CaCu_5$ type. The A and B components of the $AB_5$-type alloy are present in a mole ratio of about 1:5. The A component is generally composed of a mischmetal (a mixture of rare earth elements, generally cerium (Ce), lanthanum (La), neodymium (Nd), and praseodymium (Pr), as well as zirconium (Zr)), and the B component is generally composed of nickel (Ni), along with two or more elements selected from cobalt (co), manganese (Mn), aluminum (Al), copper (Cu), iron (Fe), or germanium (Ge). The subscripts, which indicate mole fraction, of the elements forming the A component generally have a sum of 1, while the subscripts of the elements forming the B component generally have a sum of 4.75 to 5.50.

It is desirable for metallic oxide-hydrogen storage batteries to have characteristics such as high energy density, relatively high charge retentions, relatively long cycle lives, and good discharge capacities over a range of temperatures. The hydrogen discharge reaction at the negative electrode, however, tends to slow down with decreasing temperature; discharge capacities may therefore deteriorate at low temperatures. The low temperature performance of batteries can be improved, but improved low temperature performance is often accompanied by the loss of other desirable properties such as high temperature performance, capacity (the ability to reversibly store hydrogen) or cycle life.

SUMMARY OF THE INVENTION

In general, the invention features a hydrogen storage alloy with a relatively high content of praseodymium (Pr). The preferred hydrogen storage alloy is of the $AB_5$-type; the A component of this alloy includes at least 0.4 mole fraction Pr. The alloy also includes lanthanum (La) and/or neodymium (Nd). The alloy can be used to make batteries with good low temperature discharge capacities, good ambient temperature properties, good charge retention, good cycle life, and uniform discharge capacities over a range of discharge rates.

The invention also features an alkaline storage battery that includes a positive electrode, a negative electrode including a hydrogen storage alloy having a relatively high Pr content and including La and/or Nd, and an alkaline electrolyte.

Other features and advantages of the invention will be apparent from the description of the preferred embodiments thereof, and from the claims.

BRIEF DESCRIPTION OF THE DRAWING

(FIG. 5a), 45° C. (FIG. 5b), 0° C. (FIG. 5c), –10° C. (FIG. 5d), and –20° C. (FIG. 5e).

(FIG. 8a), 45° C. (FIG. 8b), 0° C. (FIG. 8c), –10° C. (FIG. 8d), and –20° C. (FIG. 8e).

DESCRIPTION OF THE PREFERRED EMBODIMENTS

Figure 1:
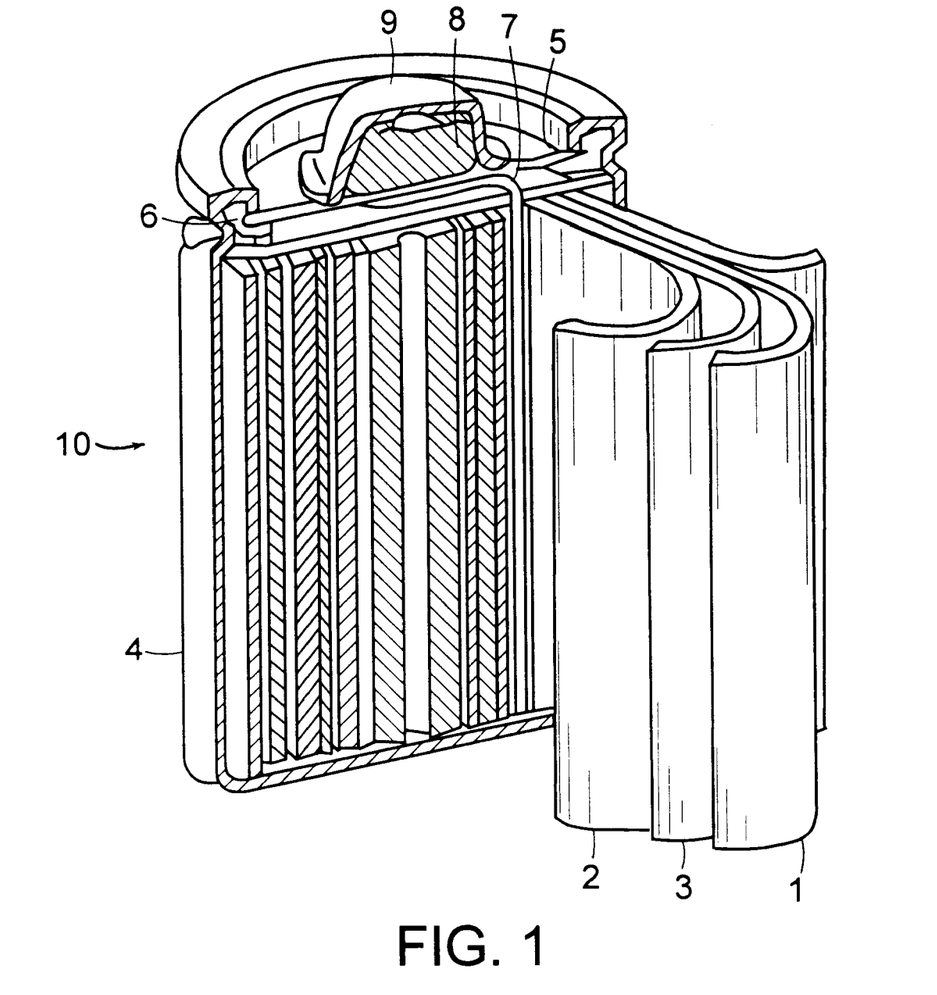
FIG. 1 is a sectional view of a cylindrical storage cell.

Referring to FIG. 1, a cylindrical battery 10 includes a negative electrode 1, a positive electrode 2, and a separator 3. The electrodes and the separator are contained within a case 4. The top end of the case 4 is closed with a sealing plate 5 and an annular insulating gasket 6 that provide a gas-tight and fluid-tight seal. A positive lead 7 connects the positive electrode 2 to the sealing plate 5. The sealing plate 5 is provided with a safety valve 8 disposed in the inner side of a positive terminal 9. The valve 8 is configured to actuate when the pressure inside the battery exceeds a predetermined value.

The main component of negative electrode 1 is an $AB_5$-type hydrogen absorbing alloy, which is formed by fusing the appropriate elements. The mixture of elements is melted in an induction furnace under vacuum, under an inert atmosphere such as argon, helium, or other non-reactive gas, under a protective atmosphere, such as an argon/hydrogen mixture, or combinations thereof. The melt is then allowed to cool. The resulting alloy is pulverized by hydrogen absorption and desorption, mechanical pulverization, jet-milling, or other methods known in the art to form a powder, which is sieved to remove particles larger than 75 microns. The alloy can be used in an as-cast and pulverized condition.

Alternatively, the alloy can be heat treated, and then pulverized. The heat treatment includes heating the alloy at 900° C. to 1100° C. for 1 to 12 hours, under vacuum, under an inert atmosphere, or under a protective atmosphere. The heat treatment helps to homogenize the elements.

Negative electrode 1 may contain other ingredients as well. For example, the electrode may include a high surface area carbon. The carbon catalyzes the conversion of $O_2$, formed at the positive electrode, into $H_2O$, thus promoting pressure reduction in the battery. The electrode may also include a binder such as polytetrafluoroethylene (PTFE), and thickeners, such as a polyvinyl alcohol/sodium polyacrylate copolymer, and carboxymethyl cellulose (CMC).

Negative electrode 1 may be prepared as follows. The alloy is combined with the carbon, the binder, the thickeners, and water to form a paste. The paste is applied to a conductive core substrate, such as perforated nickel-plated cold rolled steel foil, or expanded metal. The material then is dried, rolled, and die cut into pieces of the appropriate size.

Positive electrode 2 may include any of a number of materials known in the electrochemical arts. For example, the positive electrode may include spherical nickel hydroxide, which may contain zinc and cobalt; cobalt monoxide; a binder, such as PTFE; thickeners such as CMC and sodium polyacrylate (SPA); and a paste stabilizer such as sodium borate.

Positive electrode 2 may be prepared as follows. The ingredients are combined with water to produce a paste, which is then applied to a highly porous sintered, felt, or foam substrate. The filled substrate is compacted, then pieces of the appropriate size are cut from the substrate. A nickel tab, which serves as a current collector, is then applied by ultrasonic welding.

Separator 3 is a porous insulator film or thin sheet; the film or sheet can be composed of a polyamide (such as nylon), polypropylene, polyethylene, polysulfone, or polyvinyl chloride (PVC). A preferred material is polypropylene. The separator is cut into pieces of a similar size as the electrodes, and is placed between the negative and positive electrodes to separate them electrically.

Negative electrode 1, positive electrode 2, and separator 3 are wound into a Swiss roll and placed in a case 4 made of a metal such as nickel or nickel plated steel, or a plastic material such as PVC, polypropylene, polysulfone, ABS, or polyamide.

The case 4 is then filled with an electrolyte. The electrolyte may be any electrolyte known in the art. An ample of an electrolyte is potassium hydroxide (KOH) with a concentration of 20 to 40 weight %, plus lithium hydroxide (LIOH) with a concentration of 0 to 10 weight %.

The case 4 is then sealed with the sealing plate 5 and the annular insulating gasket 6.

Examples of cylindrical batteries that may be prepared according to the present invention include A, AA, AAA, 4/5A, 4/3A, sub-C, and half-C batteries.

Alternatively, the battery may be rectangular in form; an example of a rectangular battery is the prismatic cell described in U.S. Pat. No. 4,977,043, which is incorporated by reference in its entirety herein.

Figure 2A:
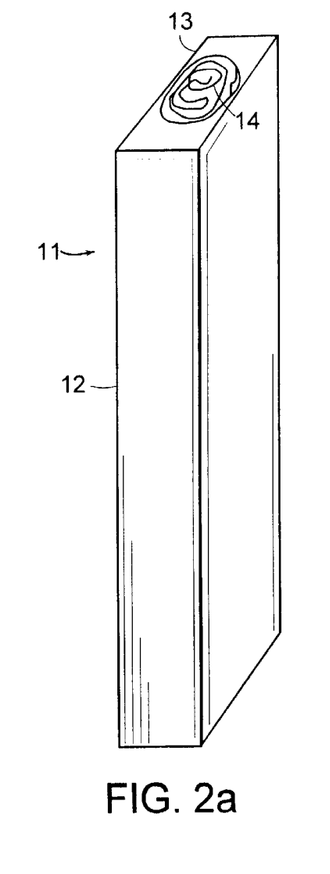
FIG. 2a is a perspective view of a rectangular storage cell.
Figure 2B:
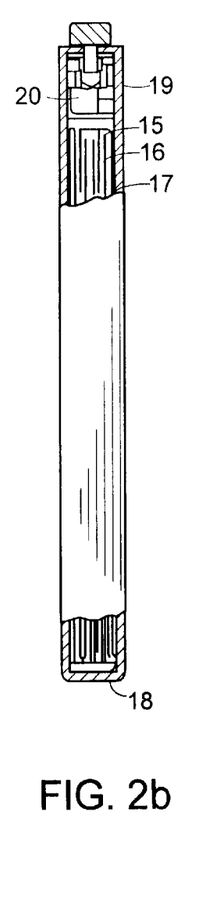
FIGS. 2b and 2c are sectional views of a rectangular storage cell.
Figure 2C:
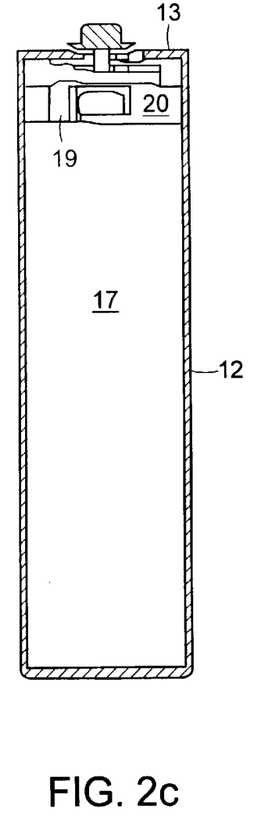

Referring to FIGS. 2a–2c, a rectangular battery 11 includes a case 12, a lid body 13, a positive electrode terminal 14, a positive electrode 15, a separator 16 which surrounds the positive electrode 15, a U-shaped negative electrode 17, a negative electrode lead 18, a positive electrode lead 19, and a frame body 20.

Figure 3:
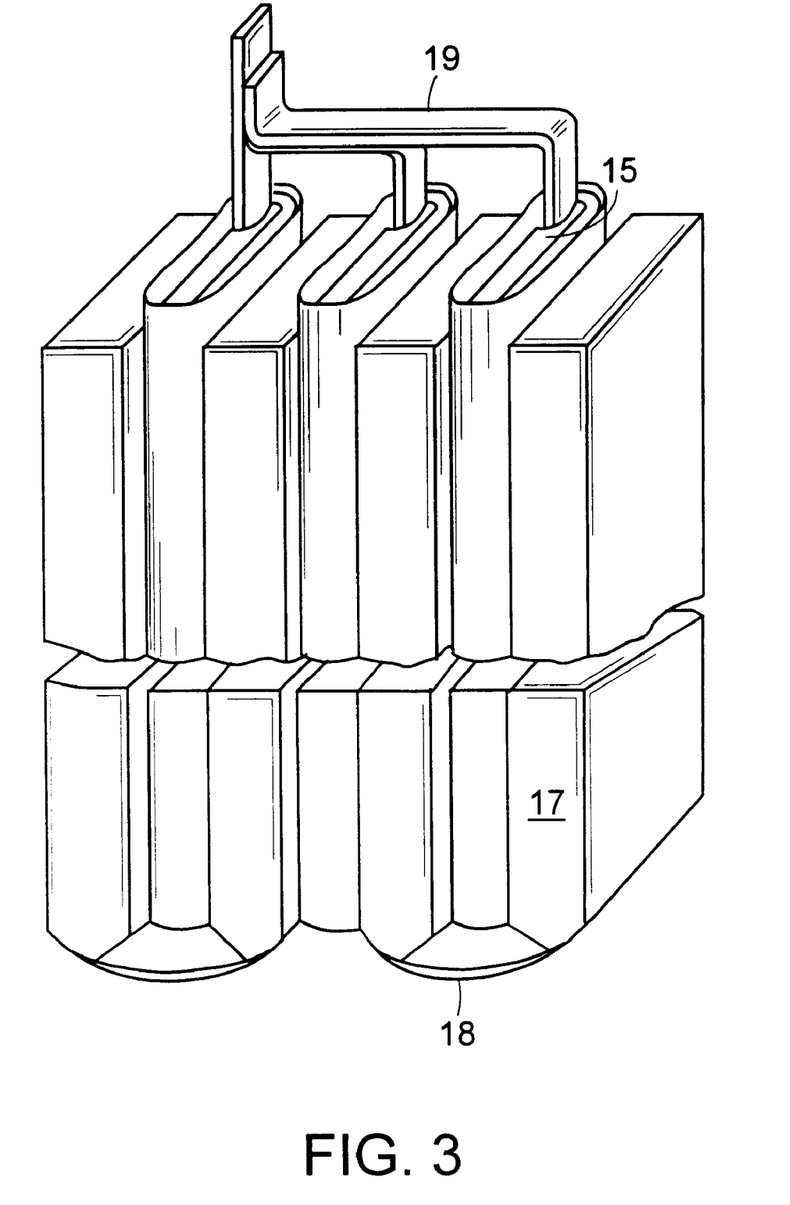
FIG. 3 is a perspective view of the electrode assembly of a rectangular storage cell.

FIG. 3 shows an expanded view of the electrode assembly. As shown there, the positive electrodes 15 are sandwiched between the U-shaped negative electrodes 17. The bottom part of the U includes a negative electrode lead 18.

The negative and positive electrodes may be prepared as described above, or as described in U.S. Pat. No. 4,977,043.

An example of a rectangular battery that may be prepared according to the present invention is a battery used to power electric vehicles.

Alternatively, a bobbin-type battery can be formed. To form this type of battery, the material forming the positive electrode is pressed into pellets. One or more of these pellets, surrounded by a separator, are placed into a case. The negative electrode material, in the form of a powder, and an electrolyte are added to the case. The case is then sealed.

Other types of batteries known in the art can be prepared as well.

EXAMPLES

Example 1

An alloy having the formula $La_{0.15}Ce_{0.15}Pr_{0.7}Ni_{3.7}Co_{0.7}Mn_{0.1}Al_{0.5}$ was made by fusing lanthanum, cerium, praseodymium, nickel, cobalt, manganese, and aluminum in the required proportions to achieve approximately 2 kg of the desired composition. The melt charge was loaded into a magnesia crucible installed in an induction furnace. The atmosphere inside the furnace chamber was evacuated to obtain a vacuum state of $\leq 0.02$ torr. Immediately before melting, the furnace chamber was filled with argon to a pressure of 780 to 790 torr, which was maintained during the melting operation. The molten charge was maintained at 1400° C.–1415° C. for one minute, and then poured onto a copper block and allowed to cool to <50° C. The resulting alloy was pulverized by hydrogen absorption and desorption. The resulting powder was sieved to remove particles larger than 75 microns.

Test cells were prepared as follows. A pellet comprising 1 gram of Ni powder and 0.35 g of the alloy was compacted under a load of 3.5 tons in a die of 12.7 mm diameter. The compacted pellet was wrapped in 60 micron thick perforated nickel-plated cold rolled steel foil to which a tab of nickel was attached. The wrapped pellet and a positive, or counter, sintered $Ni(OH)_2$ electrode were immersed in 25 cc of de-aerated aqueous electrolyte of 5.5N KOH+2.0N NaOH+ 0.5N LiOH.

The cells were conditioned at room temperature with six charge/discharge cycles consisting of a 50 mA charge for 2.7 hours, followed by a discharge of 45 mA. The cells were discharged, after the sample temperature and electrolyte temperature stabilized, to −0.6V vs. a Hg/HgO reference electrode. The capacity was then determined at 25° C., 0° C., −10° C., and −20° C. at discharge rates of C/2 (45 mA), C/3 (30 mA), and C/5 (20 mA). The results are presented in Table 1.

TABLE 1

Discharge capacities in mA · hr/g to a cut-off of −0.6 V vs. Hg/HgO

| Temperature | C/2 | C/3 | C/5 |
|---|---|---|---|
| 22° C. | 302 | 298 | 290 |
| 0° C. | 289 | 288 | — |
| −10° C. | 261 | 282 | 286 |
| −20° C. | 162 | 248 | 275 |

As Table 1 illustrates, the cells showed high discharge capacities over a broad range of temperatures.

The test cells were then connected to cell cycling equipment and charged with 50 mA for 2.7 hours. The charging cycle was followed by a rest cycle of 10 minutes, with no current flowing. The cells were then discharged at the rates of C/2, C/3, and C/5. Instead of measuring the discharge potential against a reference electrode, the discharge was terminated when the cell voltage reached 1.0V.

Figure 4:
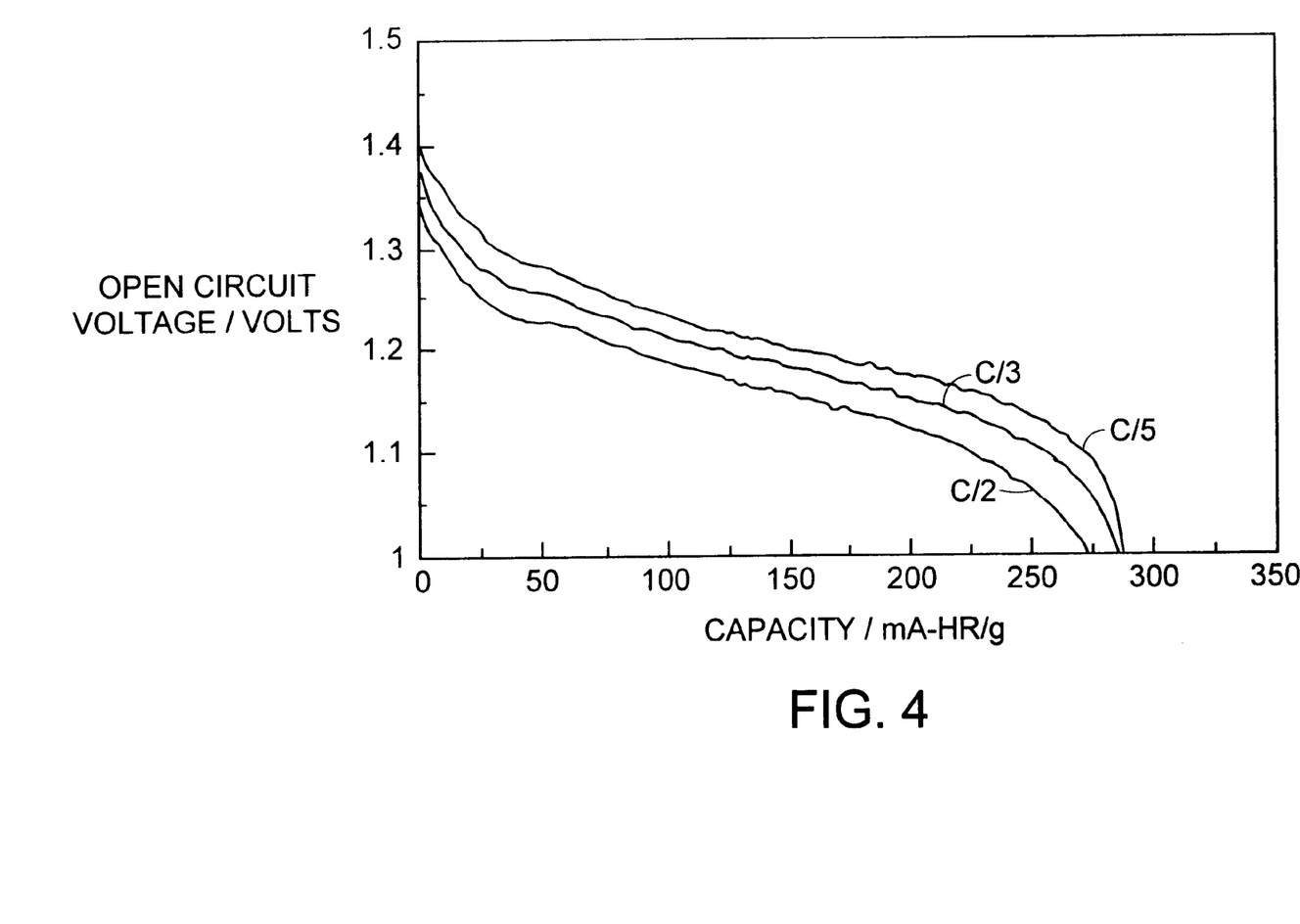
FIG. 4 is a graph showing the capacity for various discharge rates for a hydrogen storage alloy.
Figure 5A:
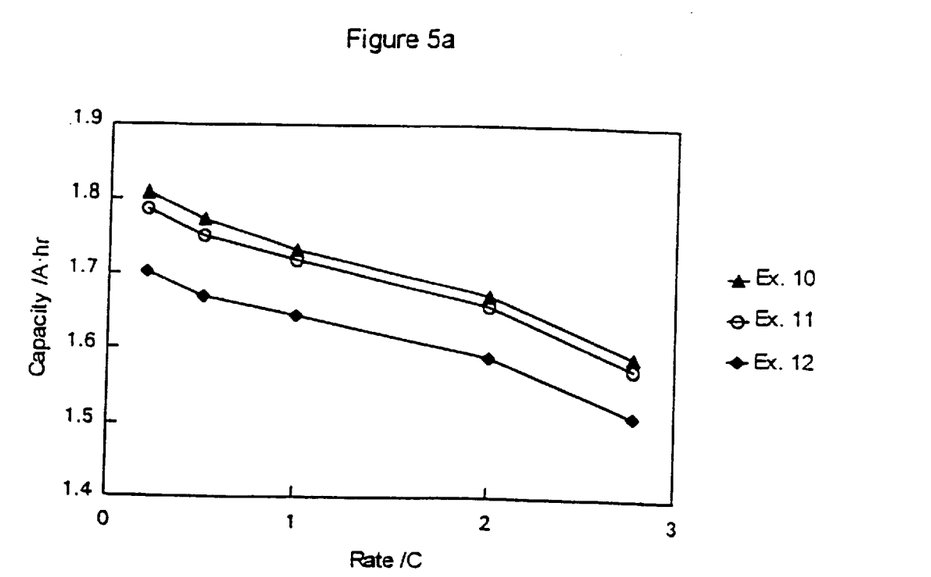
FIGS. 5a–5e are graphs showing cell capacities after conditioning for cells containing a hydrogen storage alloy at 20° C.
Figure 5B:
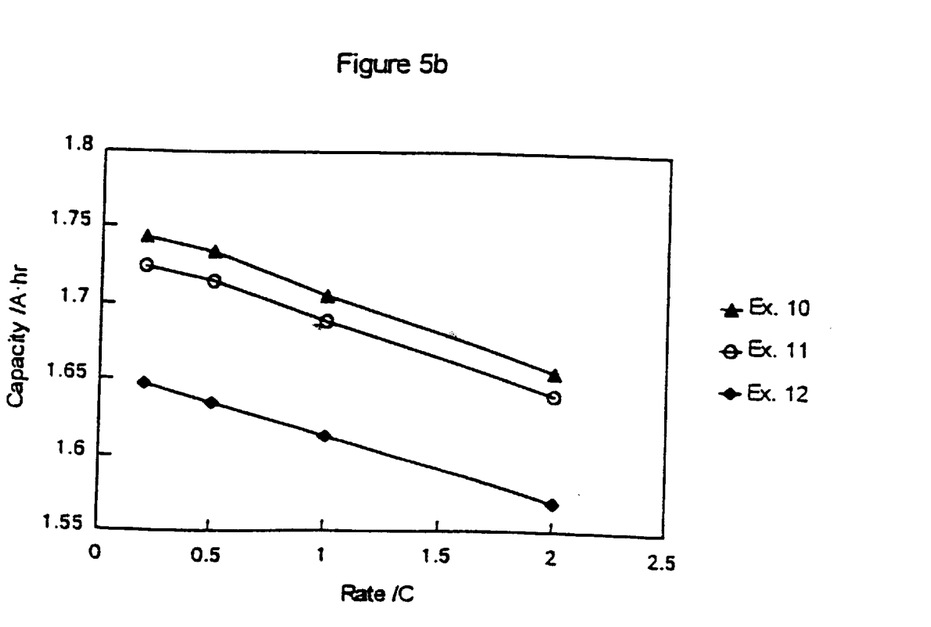
Figure 5C:
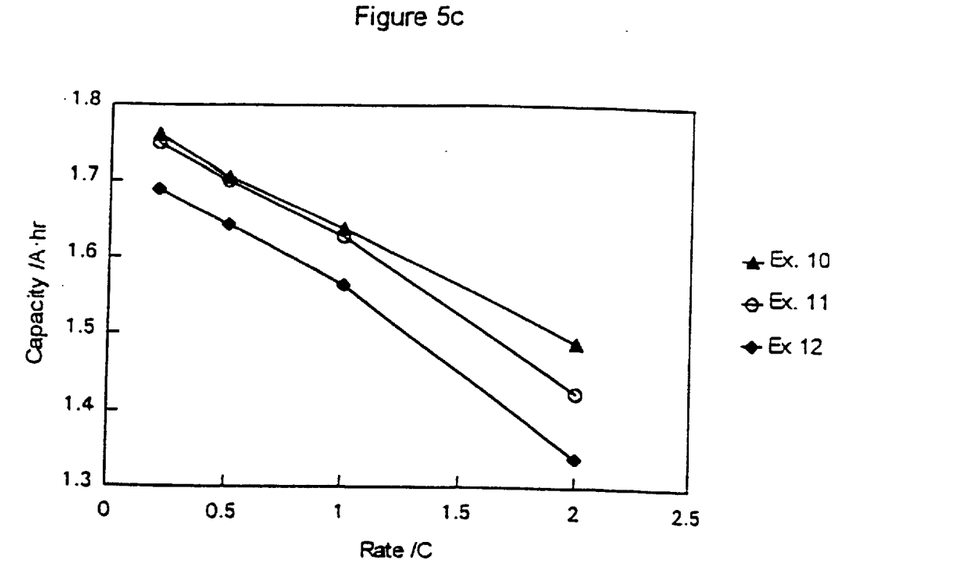
Figure 5D:
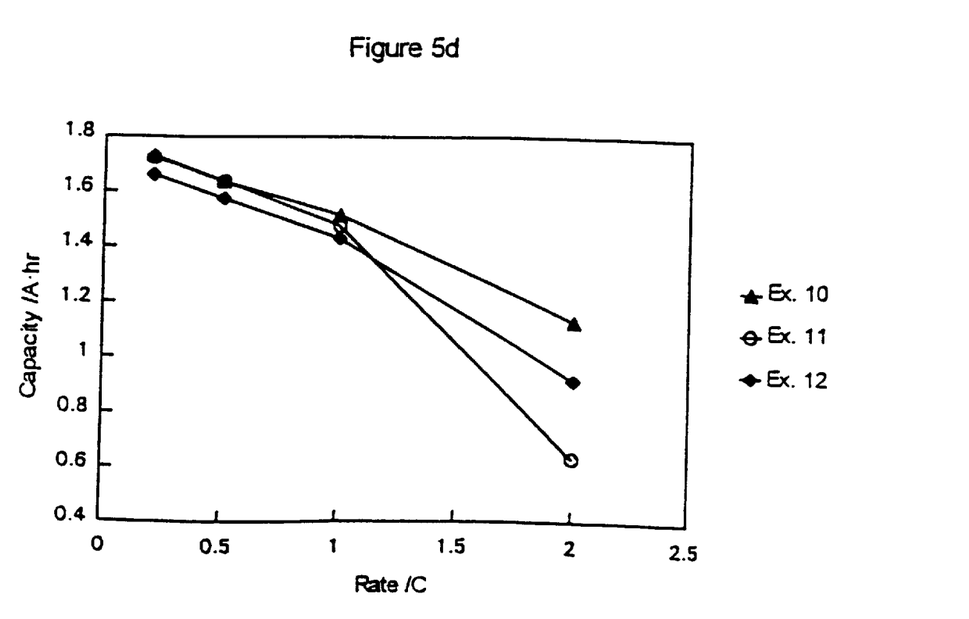
Figure 5E:
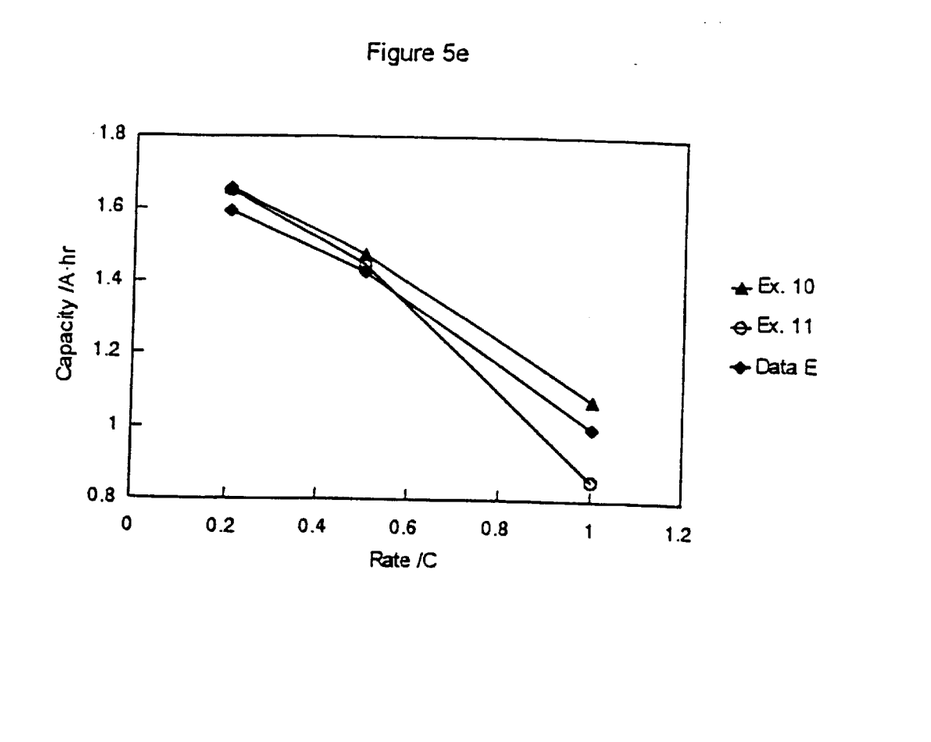

The results are shown in FIG. 4, which illustrates that the cells exhibited relatively uniform discharge capacities over a range of discharge rates. The alloy described above showed a capacity decrease of 16 mA·hr/g at C/2 compared to C/5.

Example 2

An alloy having the formula $La_{0.3}Ce_{0.15}Pr_{0.55}Ni_{3.7}Co_{0.7}Mn_{0.1}Al_{0.5}$ was prepared. Test cells containing this alloy were prepared and tested as described above. A test cell including this alloy had a discharge capacity of 273 mA·hr/g at a temperature of −20° C. and a discharge rate of C/3.

Example 3

An alloy having the formula $Lao_{0.15}Ce_{0.15}Pr_{0.63}Nd_{0.07}Zr_{0.006}Ni_{3.7}Co_{0.7}Mn_{0.1}Al_{0.5}$ was prepared. Test cells containing this alloy were prepared and tested as described above. A test cell including this alloy had a discharge capacity of 262 mA·hr/g at a temperature of −20° C. and a discharge rate of C/3.

Example 4

An alloy having the formula $La_{0.15}Ce_{0.3}Pr_{0.55}Ni_{3.7}Co_{0.7}Mn_{0.1}Al_{0.5}$ was prepared. Test cells containing this alloy were prepared and tested as described above. A test cell including this alloy had a discharge capacity of 231 mA·hr/g at a temperature of −20° C. and a discharge rate of C/3.

Example 5

An alloy having the formula $La_{0.15}Pr_{0.85}Ni_{3.7}Co_{0.7}Mn_{0.1}Al_{0.5}$ was prepared. Test cells containing this alloy were prepared and tested as described above. A test cell including this alloy had a discharge capacity of 245 mA·hr/g at a temperature of −20° C. and a discharge rate of C/3.

Example 6

An alloy having the formula $La_{0.3}Pr_{0.7}Ni_{3.7}Co0.7Mn_{0.1}Al_{0.5}$ was prepared. Test cells containing this alloy were prepared and tested as described above. A test cell including this alloy had a discharge capacity of 263 mA·hr/g at a temperature of −20° C. and a discharge rate of C/3.

Example 7

An alloy having the formula $La_{0.3}Ce_{0.3}Pr_{0.4}Ni_{3.7}Co_{0.7}Mn_{0.1}Al_{0.5}$ was prepared. Test cells containing this alloy were prepared and tested as described above. A test cell including this alloy had a discharge capacity of 232 mA·hr/g at a temperature of −20° C. and a discharge rate of C/3.

Example 8

An alloy having the formula $La_{0.1}Ce_{0.01}Pr_{0.8}Ni_{3.7}Co_{0.7}Mn_{0.1}Al_{0.5}$ was prepared. Test cells containing this alloy were prepared and tested as described above. A test cell including this alloy had a discharge capacity of 258 mA·hr/g at a temperature of −20° C. and a discharge rate of C/3.

Example 9

An alloy having the formula $La_{0.48}Ce_{0.03}Pr_{0.4}Nd_{0.9}Zr_{0.006}Ni_{4.08}Co_{0.4}Mn_{0.44}Al_{0.34}$ was prepared the procedure described above. A test cell, including this alloy had a discharge capacity of 254 mA·hr/g at a temperature of −20° C. and a discharge rate of C/3.

Example 10

A 4/5A battery of the type shown in FIG. 1 was prepared using the general procedure described above.

The main component of the negative electrode 1 was a hydrogen storage alloy having the formula $La_{0.5}Ce_{0.15}Pr_{0.7}Ni_{3.7}Co_{0.7}Mn_{0.1}Al_{0.5}$. The alloy was pulverized by hydrogen absorption and desorption, and then sieved. The electrode also included (relative to the amount of hydrogen storage alloy, by weight): 0.7% high surface area carbon; 2.0% PTFE; 0.29% polyvinyl alcohol/sodium polyacrylate copolymer; and 0.12% CMC. The substrate used was perforated nickel plated cold rolled steel foil.

The main component of positive electrode 2 was nickel hydroxide, which included 5.0% zinc and 0.75% cobalt. The electrode also included (relative to the amount of nickel hydroxide, by weight): 0.5% PTFE; 0.13% CMC; 0.18% SPA; 5.0% cobalt oxide; and 0.1% sodium borate. The substrate used was a porous nickel material.

The electrolyte included 5.5N KOH+2.0N NaOH+0.5N LiOH, and the separator 3 was polypropylene.

Example 11

A 4/5A battery of the type shown in FIG. 1 was prepared using the general procedure described above.

The main component of the negative electrode 1 was a hydrogen storage alloy having the formula $La_{0.3}Ce_{0.15}Pr_{0.55}Ni_{3.7}Co_{0.7}Mn_{0.1}Al_{0.5}$. The alloy was pulverized by hydrogen absorption and desorption, and then sieved. The electrode also included (relative to the amount of hydrogen storage alloy, by weight): 0.7% high surface area carbon; 2.0% PTFE; 0.29% polyvinyl alcohol/sodium polyacrylate copolymer; and 0.12% CMC. The substrate used was perforated nickel plated cold rolled steel foil.

The main component of positive electrode 2 was nickel hydroxide, which included 5.0% zinc and 0.75% cobalt. The electrode also included (relative to the amount of nickel hydroxide, by weight): 0.5% PTFE; 0.13% CMC; 0.18% SPA; 5.0% cobalt oxide; and 0.1% sodium borate. The substrate used was a porous nickel material.

The electrolyte included 5.5N KOH+2.0N NaOH+0.5N LiOH, and the separator 3 was polypropylene.

Example 12

A 4/5A battery of the type shown in FIG. 1 was prepared using the general procedure described above.

The main component of the negative electrode 1 was a hydrogen storage alloy having the formula $La_{0.48}Ce_{0.03}Pr_{0.4}Nd_{0.09}Ni_{4.08}Co_{0.4}Mn_{0.44}Al_{0.34}$. The alloy was pulverized by hydrogen absorption and desorption, and then sieved. The electrode also included (relative to the amount of hydrogen storage alloy, by weight): 0.7% high surface area carbon; 2.0% PTFE; 0.29% polyvinyl alcohol/sodium polyacrylate copolymer; and 0.12% CMC. The substrate used was perforated nickel plated cold rolled steel foil.

The main component of positive electrode 2 was nickel hydroxide, which included 5.0% zinc and 0.75% cobalt. The electrode also included (relative to the amount of nickel hydroxide, by weight): 0.5% PTFE; 0.13% CMC; 0.18% SPA; 5.0% cobalt oxide; and 0.1% sodium borate. The substrate used was a porous nickel material.

The electrolyte included 5.5N KOH+2.0N NaOH+0.5N LiOH, and the separator 3 was polypropylene.

Testing of Examples 10, 11, and 12

The nominal designed capacity of the cells of Examples 10, 11, and 12 was 1800 mA·hr. Cells were charged for four hours at 90 mA then for 18 hours at 180 mA. The cells were allowed to rest for 30 minutes with no current flowing. The cells were then discharged at a current of 360 mA until the cell voltage fell to 1.0V. After resting for 30 minutes, the cells were given five conditioning cycles according to the following schedule: charge at C/5 (a charge current of 360 mA) with a charge termination of 10 mV $-\Delta V$; rest for 30 minutes with no current flowing; discharge at C/5 (360 mA) to 1.0V; and rest 30 minutes rest with no current flow.

After conditioning, five cells of each of Examples 30 10, 11, and 12 were tested for dependency on discharge rate (0.2C to 2.8C) and discharge temperature ($-20°$ C. to $45°$ C.). The cells were given a three-hour rest at $20°$ C. prior to being charged at 600 mA for 3.75 hours at $20°$ C. The cells were then allowed to rest for three hours at the test temperature prior to discharge at a rate between 0.2C (or 0.36 Amp) and 2.8C (5.0 Amp). In FIGS. 5a–5e, each datum is the average of 5 measurements. The results shown in FIGS. 5a–5e indicate that cells from Examples 10, 11, and 12 have high discharge capacity over a wide range of temperatures and discharge rates. For example, the discharge capacity can be greater than 260 mA·hr/g, preferably greater than 280 mA·hr/g, at room temperature or greater than 230 mA·hr/g, preferably greater than 250 mA·hr/g, at $-20°$ C. and a discharge rate of C/3. The data in FIG. 5a were collected at $20°$ C. The data in FIG. 5b were collected at $45°$ C. The data in FIG. 5c were collected at $0°$ C. The data in FIG. 5d were collected at $-10°$ C. The data in FIG. 5e were collected at $-20°$ C.

Figure 6:
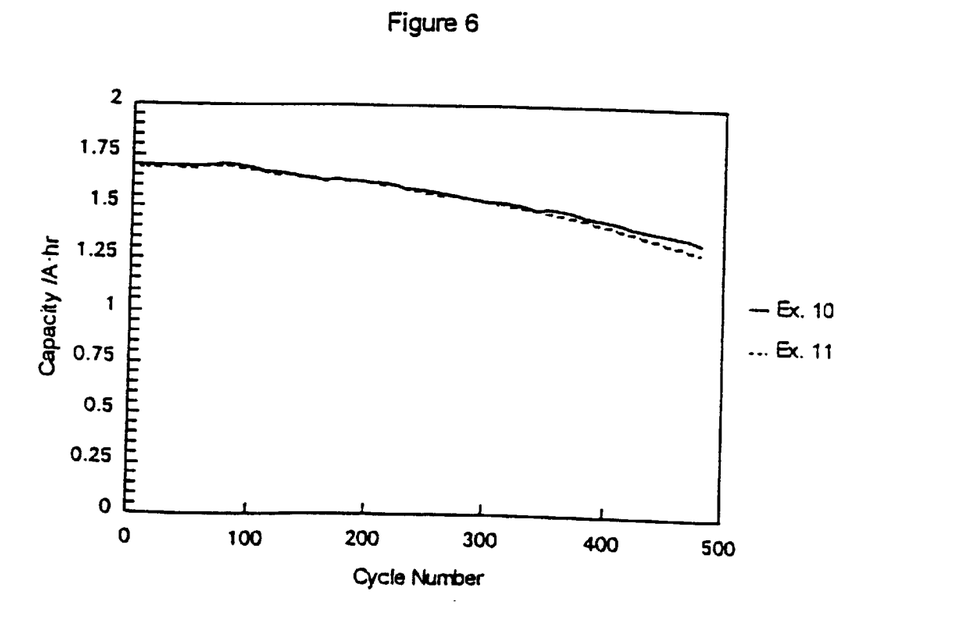
FIG. 6 is a graph showing cell cycle life for cells containing a hydrogen storage alloy at 20° C.

After conditioning, four cells from each of Examples 10 and 11 were also tested for cycle life at $20°$ C. The cells were cycled according to the following procedure: charge at $20°$ C. at 1.8 A with a charge termination of 10 mV $-\Delta V$, rest for 30 minutes at $20°$ C. with no current flow, discharge at $20°$ C. at 1.8 A to 1.0V, and rest for 30 minutes with no current flow. Both groups of cells show good cycle life. Cycle life of a battery is the number of charging cycles that the battery can withstand during which the capacity of the battery remains above a threshold level (e.g., 80% of the original capacity). Good cycle life can be greater than 200 cycles, preferably greater than 300 cycles, at room temperature or greater than 150 cycles, preferably greater than 200 cycles at $45°$ C. Results of the cycling experiments are shown in FIG. 6. The curves in FIG. 6 are for the average capacities for each of the four cells from Example 10 and 11.

Figure 7:
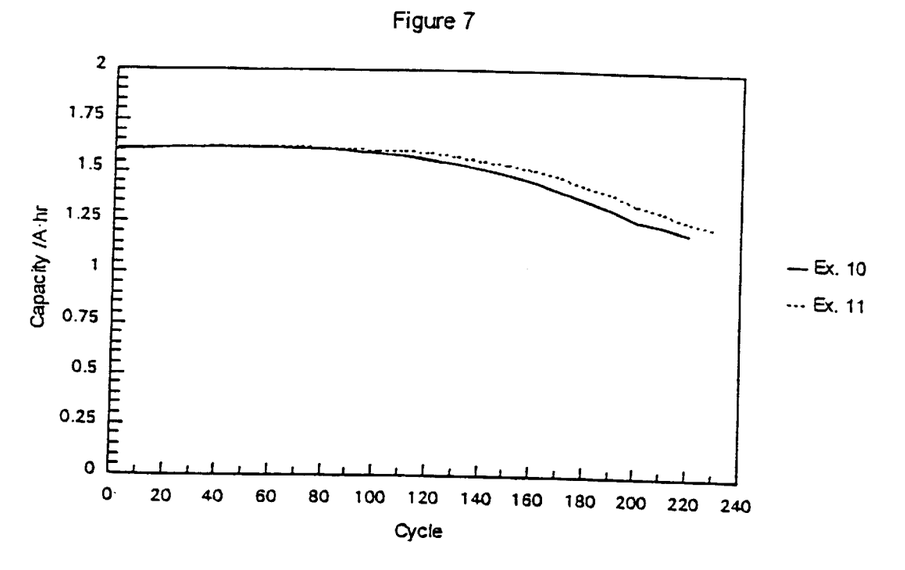
FIG. 7 is a graph showing cell cycle life for cells containing a hydrogen storage alloy at 45° C.

Another set of cells from Examples 10 and 11 were tested for cycle life at $45°$ C. The cells were cycled according to the following procedure: charge at $45°$ C. at 1.8 A with a charge termination of 10 mV $-\Delta V$, rest for 30 minutes at $45°$ C. with no current flow, discharge at $45°$ C. at 1.8 A to 1.0V, and rest for 30 minutes with no current flow. Both groups of cells show good cycle life. Results are shown in FIG. 7.

Example 13

The alloy used in Example 13 was that shown in Example 3. The nominal designed capacity of the cells was 1800 mA·hr. Cells were charged for four hours at 90 mA then for 18 hours at 180 mA. The cells were then allowed to rest for 30 minutes with no current flowing; the cells were then discharged at a current of 360 mA until the cell voltage fell to 1.0V. After a rest of 30 minutes, the cells were given five conditioning cycles according to the following regime: charge at C/5 (a charge of 360 mA) with a charge termination of 10 mV $-\Delta V$, rest for 30 minutes with no current flow, discharge at C/5 (360 mA) to 1.0V, and rest for 30 minutes with no current.

Figure 8A:
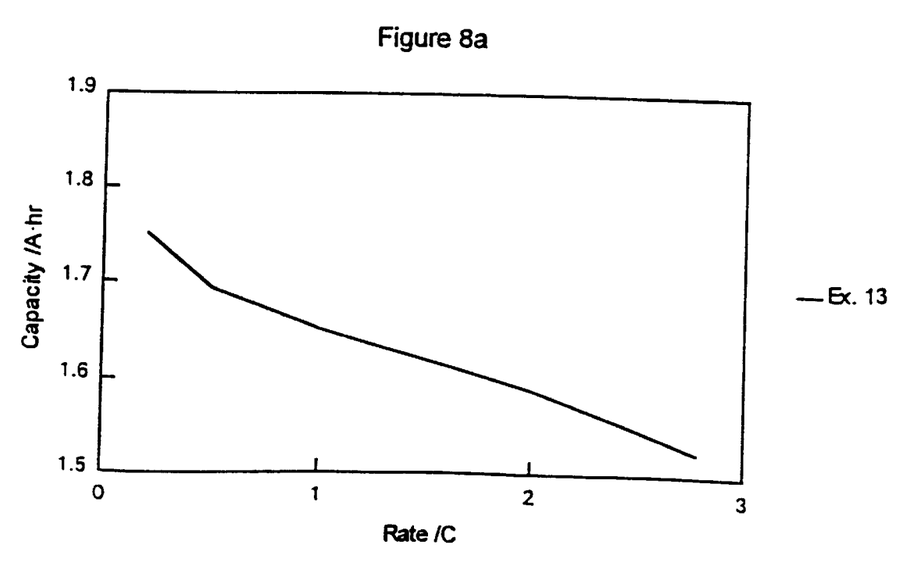
FIGS. 8a–8e are graphs showing cell capacities after conditioning for a cell containing a hydrogen storage alloy at 20° C.
Figure 8B:
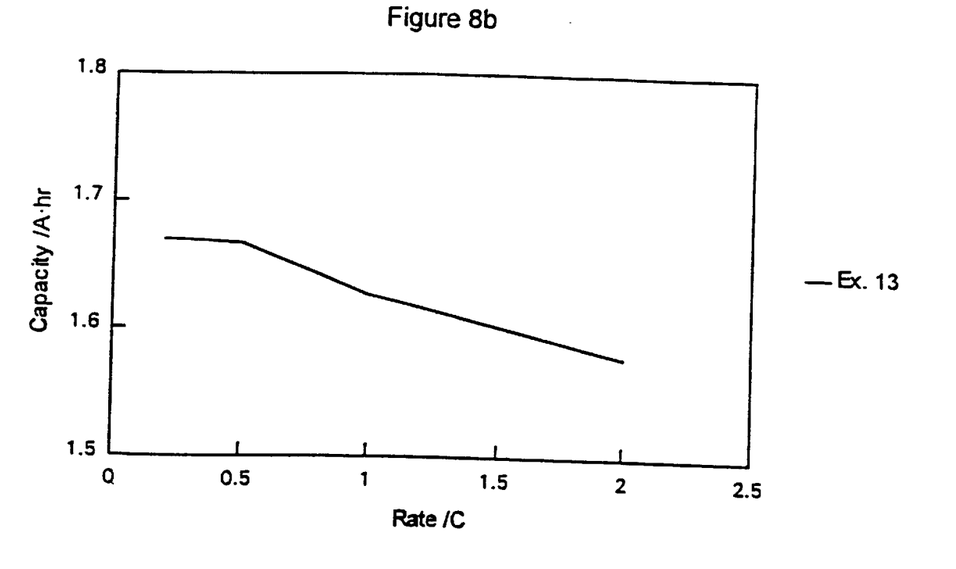
Figure 8C:
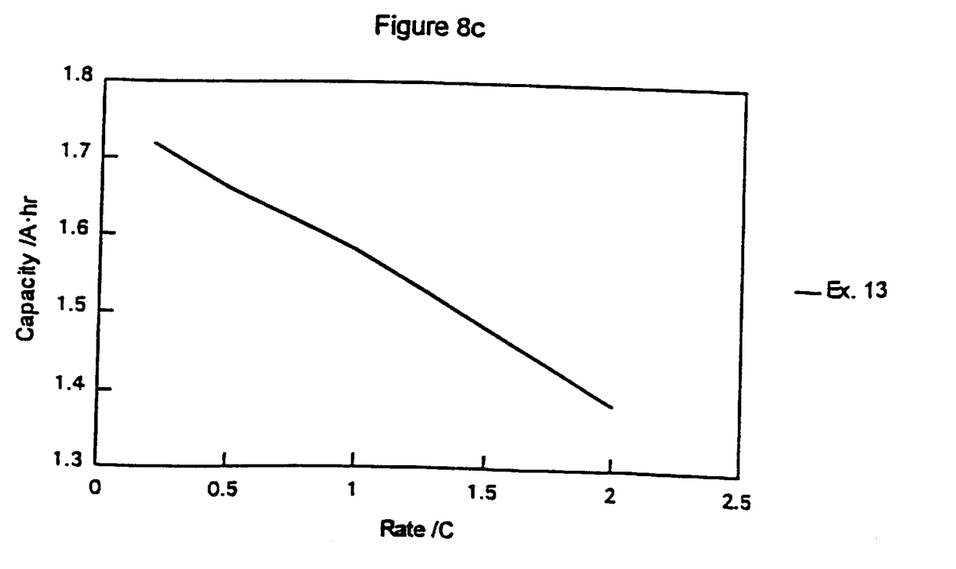
Figure 8D:
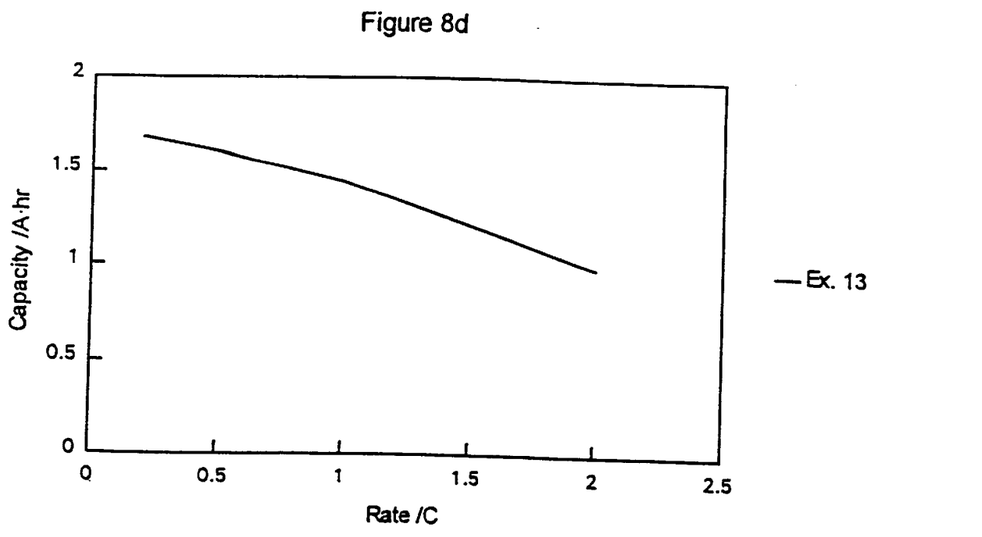
Figure 8E:
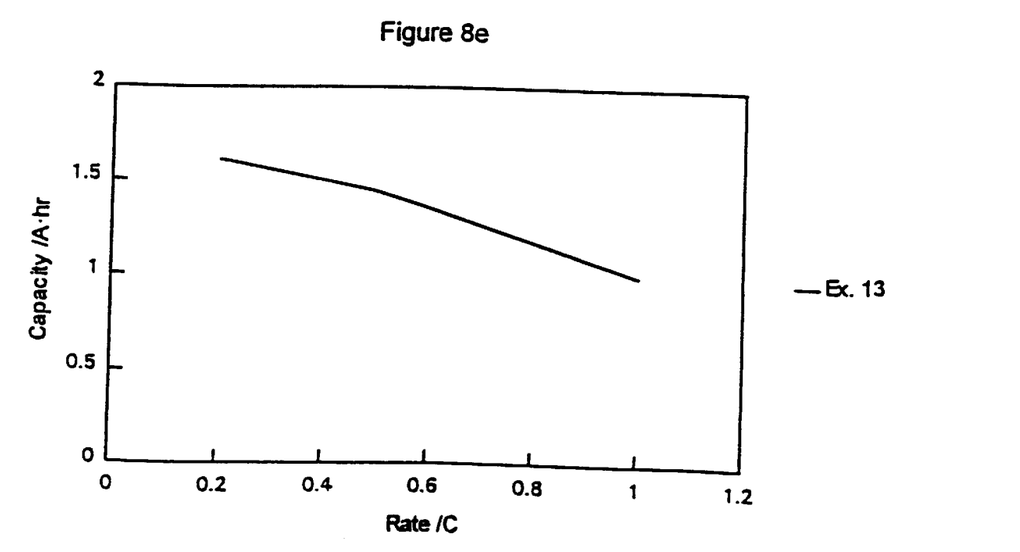

After conditioning, three cells were tested for dependency on discharge rate (0.2C to 2.8C) and discharge temperature ($-20°$ C. to $45°$ C.). The cells were given a three-hour rest at $20°$ C. prior to being charged at 600 mA for 3.75 hours at $20°$ C. The cells were then allowed to rest for three hours at the test temperature prior to discharge at the rate and temperature indicated. The results shown in FIGS. 8a to 8e indicate that both groups of cell have high discharge capacity over a wide range of temperatures and discharge rates. In FIGS. 8a to 8e each datum is the average of 5 values. FIG. 8a shows the discharge capacities at $20°$ C. at rates from 0.2C (or 0.36A) to 2.8C (5.0A). FIG. 8b shows the discharge capacities at $45°$ C. FIG. 8c shows the discharge capacities at $0°$ C. FIG. 8d shows the discharge capacities at $-10°$ C. FIG. 8e shows the discharge capacities at $-20°$ C. Other embodiments are within the claims.

What is claimed is:

1. A hydrogen storage alloy of the AB5-type, wherein the A component comprises La and at least 0.63 mole fraction Pr.

2. The hydrogen storage alloy of claim 1, wherein the B component of said alloy comprises Mn.

3. The hydrogen storage alloy of claim 1, wherein the B component of said alloy comprises 0.01 to 0.6 mole fraction Al.

4. The hydrogen storage alloy of claim 1, wherein the A component of said alloy further comprises 0.01 to 0.3 mole fraction Nd.

5. The hydrogen storage alloy of claim 1, wherein the A component of said alloy further comprises 0.001 to 0.1 mole fraction Zr.

6. The hydrogen storage alloy of claim 1, wherein the B component of said alloy comprises Cu.

7. The hydrogen storage alloy of claim 1, wherein the B component of said alloy comprises Fe.

8. A hydrogen storage alloy of the AB5-type, wherein the A component of said alloy comprises Nd and at least 0.63 mole fraction Pr.

9. The hydrogen storage alloy of claim 8, wherein the B component of said alloy comprises Mn.

10. The hydrogen storage alloy of claim 8, wherein the B component of said alloy further comprises 0.1 to 0.6 mole fraction Al.

11. The hydrogen storage alloy of claim 8, wherein the A component of said alloy further comprises 0.01 to 0.5 mole fraction La.

12. The hydrogen storage alloy of claim 8, wherein the A component of said alloy further comprises 0.001 to 0.1 mole fraction Zr.

13. The hydrogen storage alloy of claim 8, wherein the B component of said alloy comprises Cu.

14. The hydrogen storage alloy of claim 8, wherein the B component of said alloy comprises Fe.

15. A hydrogen storage alloy of the AB5-type, said alloy comprising:

0.01 to 0.5 mole fraction La;

0 to 0.4 mole fraction Ce;

0 to 0.3 mole fraction Nd;

0.63 to 1.0 mole fraction Pr;

1.0 to 5.0 mole fraction Ni;

0.1 to 1.0 mole fraction Co;

0.01 to 0.5 mole fraction Mn; and 0.01 to 0.6 mole fraction Al.

16. A hydrogen storage alloy of the AB5-type, said alloy comprising:

0.01 to 0.3 mole fraction La;

0 to 0.2 mole fraction Ce;

0 to 0.1 mole fraction Nd;

0.63 to 0.8 mole fraction Pr;

1.0 to 4.0 mole fraction Ni;

0.1 to 0.8 mole fraction Co;

0.01 to 0.2 mole fraction Mn; and 0.01 to 0.6 mole fraction Al.

17. A hydrogen storage alloy of the $AB_5$-type, said alloy having the formula $La_{0.15}Ce_{0.15}Pr_{0.7}Ni_{3.7}Co_{0.7}Mn_{0.1}Al_{0.5}$.

18. A hydrogen storage alloy of the $AB_5$-type, said alloy having the formula $La_{0.15}Ce_{0.15}Nd_{0.07}Pr_{0.63}Zr_{0.006}Ni_{3.7}Co_{0.7}Mn_{0.1}Al_{1.5}$.

19. An alkaline storage battery comprising a positive electrode; a negative electrode comprising a hydrogen storage alloy of the AB5-type, wherein the A component of said alloy comprises La and at least 0.63 mole fraction Pr; and an alkaline electrolyte.

20. The battery of claim 19, wherein the B component of said hydrogen storage alloy comprises Mn.

21. The battery of claim 19, wherein the B component of said hydrogen storage alloy comprises 0.1 to 0.6 mole fraction Al.

22. The battery of claim 19, wherein the A component of said hydrogen storage alloy further comprises 0.01 to 0.3 mole fraction Nd.

23. The battery of claim 19, wherein the B component of said hydrogen storage alloy comprises Cu.

24. The battery of claim 19, wherein the B component of said hydrogen storage alloy comprises Fe.

25. The battery of claim 19, wherein said positive electrode comprises a metal oxide.

26. The battery of claim 19, wherein said positive electrode comprises nickel oxide.

27. An alkaline storage battery comprising a positive electrode; a negative electrode comprising a hydrogen storage alloy of the AB5-type, wherein the A component of said alloy comprises Nd and at least 0.63 mole fraction Pr; and an alkaline electrolyte.

28. The battery of claim 27, wherein the B component of said hydrogen storage alloy comprises Mn.

29. The battery of claim 27, wherein the B component of said hydrogen storage alloy comprises 0.1 to 0.6 mole fraction Al.

30. The battery of claim 27, wherein the A component of said hydrogen storage alloy further comprises 0.01 to 0.5 mole fraction La.

31. The battery of claim 27, wherein the B component of said hydrogen storage alloy comprises Cu.

32. The battery of claim 27, wherein the B component of said hydrogen storage alloy comprises Fe.

33. The battery of claim 27, wherein said positive electrode comprises a metal oxide.

34. The battery of claim 27, wherein said positive electrode comprises nickel oxide.

35. The battery of claim 19, wherein battery has a discharge capacity that decreases by less than 20 percent over 200 charge/dicharge cycles at 20° C.

36. The battery of claim 35, wherein the discharge capacity decreases by less than 20 percent over 300 charge/discharge cycles at 20° C.

37. The battery of claim 27, wherein battery has a discharge capacity that decreases by less than 20 percent over 200 charge/discharge cycles at 20° C.

38. The battery of claim 37, wherein the discharge capacity decreases by less than 20 percent over 300 charge/discharge cycles at 20° C.

39. A method of improving rechargeable cell cyclability comprising placing a negative electrode including a hydrogen storage alloy of the AB5-type, wherein the A component comprises La and at least 0.4 mole fraction Pr, into a cell before the first charging cycle of the cell, whereby the discharge capacity of the cell decreases by less than 20 percent over 200 charge/discharge cycles at 20° C.

40. The method of claim 39, wherein the discharge capacity decreases by less than 20 percent over 300 charge/discharge cycles at 20° C.

* * * * *

UNITED STATES PATENT AND TRADEMARK OFFICE
CERTIFICATE OF CORRECTION

PATENT NO. : 6,197,448 B1  
DATED : March 6, 2001  
INVENTOR(S) : Gaydos et al.

Page 1 of 1

It is certified that error appears in the above-identified patent and that said Letters Patent is hereby corrected as shown below:

Column 9, claim 18,
Delete [Al$_{\lambda.5}$.] and insert -- Al$_{0.5}$.--

Signed and Sealed this

Nineteenth Day of February, 2002

Attest:

JAMES E. ROGAN
*Attesting Officer*    *Director of the United States Patent and Trademark Office*